(12) United States Patent
Warmer et al.

(10) Patent No.: US 12,728,948 B2
(45) Date of Patent: Sep. 8, 2026

(54) METHOD FOR PAIRING A CONTROLLER WITH AN ELECTRIC BICYCLE

(71) Applicant: Robert Bosch GmbH, Stuttgart (DE)

(72) Inventors: Christoph Warmer, Stuttgart (DE); Adrian Wodniok, Frankfurt am Main (DE); Fred Luna Matos, Berlin (DE); Francesco Carello, Frankfurt am Main (DE); Tobias Nenke, Muehlheim (DE)

(73) Assignee: Robert Bosch GmbH, Stuttgart (DE)

( * ) Notice: Subject to any disclaimer, the term of this patent is extended or adjusted under 35 U.S.C. 154(b) by 18 days.

(21) Appl. No.: 18/853,003

(22) PCT Filed: Feb. 7, 2023

(86) PCT No.: PCT/EP2023/052957
§ 371 (c)(1), (2) Date: Sep. 30, 2024

(87) PCT Pub. No.: WO2023/193978
PCT Pub. Date: Oct. 12, 2023

(65) Prior Publication Data

US 2025/0214674 A1 Jul. 3, 2025

(30) Foreign Application Priority Data

Apr. 7, 2022 (DE) ..................... 10 2022 203 517.8

(51) Int. Cl.

| | |
|---|---|
| ***B62J 50/20*** | (2020.01) |
| ***B62M 6/45*** | (2010.01) |
| ***H04W 4/80*** | (2018.01) |
| *B62J 50/21* | (2020.01) |
| *B62J 50/22* | (2020.01) |

(52) U.S. Cl.
CPC ................ *B62M 6/45* (2013.01); *B62J 50/20* (2020.02); *H04W 4/80* (2018.02); *B62J 50/21* (2020.02); *B62J 50/22* (2020.02)

(58) Field of Classification Search
CPC . B62M 6/00; H04L 67/01; H04L 67/12; B62J 50/20–22
See application file for complete search history.

(56) References Cited

U.S. PATENT DOCUMENTS

| | | | | |
|---|---|---|---|---|
| 9,491,788 | B1 * | 11/2016 | Kasai | H04W 4/80 |
| 11,465,712 | B2 * | 10/2022 | Kawakami | B62K 23/02 |

(Continued)

OTHER PUBLICATIONS

International Search Report corresponding to PCT Application No. PCT/EP2023/052957, mailed May 9, 2023 (German and English language document) (5 pages).

(Continued)

*Primary Examiner* — Dino Kujundzic
(74) *Attorney, Agent, or Firm* — Maginot, Moore & Beck LLP

(57) ABSTRACT

A method for pairing a control device for an electric bicycle includes (i) connecting the control device to a first server, (ii) connecting the control device to an electric bicycle, (iii) providing a first bicycle ID and a second bicycle ID of the electric bicycle, (iv) providing pairing data from the first server on the basis of the first bicycle ID, (v) connecting the control device to a second server, and (vi) providing further pairing data from the second server on the basis of the second ID.

11 Claims, 3 Drawing Sheets

(56) References Cited

U.S. PATENT DOCUMENTS

| | | | | |
|---|---|---|---|---|
| 2016/0221627 | A1* | 8/2016 | Hines | B62J 43/20 |
| 2017/0327184 | A1* | 11/2017 | Contello | B62M 9/04 |
| 2018/0197401 | A1 | 7/2018 | Khaligh et al. | |
| 2021/0206454 | A1 | 7/2021 | Contello et al. | |
| 2021/0291922 | A1 | 9/2021 | Hines et al. | |
| 2022/0306227 | A1* | 9/2022 | Silsby | B62J 7/04 |

OTHER PUBLICATIONS

Robert Bosch GmbH: Nyon operating instructions Online-Version. 1 270 020 Wde. Reutlingen, 2016. S. 1-68.

GPS Cyclist: Bosch Nyon 2 Set up—All important settings—Instructions clearly explained. Sep. 1, 2021. URL: https://www.youtube.com/watch?v=v2mmvSjosyw.

* cited by examiner

METHOD FOR PAIRING A CONTROLLER WITH AN ELECTRIC BICYCLE

This application is a 35 U.S.C. § 371 National Stage Application of PCT/EP2023/052957, filed on Feb. 7, 2023, which claims the benefit of priority to Serial No. DE 10 2022 203 517.8, filed on Apr. 7, 2022 in Germany, the disclosures of which are incorporated herein by reference in their entirety.

SUMMARY

The disclosure relates to a method for pairing a control device for an electric bicycle, comprising the following method steps:

- connecting the control device to a first server;
- connecting the control device to an electric bicycle;
- providing a first bicycle ID and a second bicycle ID of the electric bicycle;
- providing pairing data from the first server on the basis of the first ID;
- connecting the control device to a second server;
- providing further pairing data from the second server on the basis of the second ID.

Advantageously, the control device can thereby be optimally paired to the electric bicycle.

The control device is connected in the state associated with the electric bicycle, such that data and/or information is interchangeable between the control device and the electric bicycle. In particular, the control device comprises a display unit configured to display operating information of the electric bicycle. For example, the operational information may be a charge state of a power supply unit of the electric bicycle, a speed of the electric bicycle, a currently selected support mode, or error information. Furthermore, it is conceivable that the electric bicycle may provide further operating parameters, for example a position variable, which may be configured as a geographic coordinate and/or height information. The control device is also configured to control or regulate the electric bicycle. In this context, a control of the electric bicycle is to be understood in particular to mean that the control device is configured for controlling, regulating, or setting an electric bicycle function. For example, it is conceivable that the control device is configured such that a drive unit of the electric bicycle is activatable, deactivatable, and/or lockable by means of the control device. It is also conceivable that the control device may be configured to configure the electric bicycle by the user. For example, it is conceivable that the assist modes of the electric bicycle are pairable via the control device, wherein the drive unit of the electric bicycle is controlled depending on the assist mode selected. The control device is preferably configured as a releasably connectable device to the electric bicycle, for example, a smart phone or smartwatch.

In the context of this application, an electric bicycle is in particular understood to mean a bicycle which comprises a drive unit for assisting the rider. The electric bicycle is preferably designed as an e-bike, a pedelec, a cargo bicycle, a folding bicycle, or the like. The drive unit comprises a motor which can, e.g., be designed as a mid-drive motor or as a hub motor. The motor is preferably designed as an electric motor. The drive unit is connected to the energy supply device to supply the drive unit with energy. The power supply unit is preferably configured as a battery pack and comprises a battery housing, which is preferably releasably connected to a frame of the bike. The electric bicycle comprises an electronic system comprising a control unit for controlling or regulating the electric bicycle. The electronic system preferably comprises a sensor unit, wherein the sensor unit can comprise, e.g., motion sensors, torque sensors, speed sensors, GPS sensors, magnetic sensors, or the like. The electronic system further comprises a communication interface for wirelessly connecting the electric bicycle to a control device and/or to a server.

The connection of the control device to the first server is preferably via wireless data exchange. In particular, the control device has a communication interface for this purpose. For example, the communication interface may be configured as a Bluetooth, WLAN, LTE, 5G, Zigbee interface, or the like. The connection may be made automatically by launching a computer program or may be initiated by a user input. To identify the control device or the user to the first server, a user ID is transmitted. In particular, data associated with the user account associated with the user ID is thereby provided to the control device.

The control device may be connected to the electric bicycle via the same communication interface as the connection of the control device to the first server. Alternatively, it is also conceivable that the connection is made via a further communication interface.

In particular, the first bicycle ID and the second bicycle ID are provided by the electric bicycle. Preferably, the electric bicycle comprises a storage unit in which the first bicycle ID and the second bicycle ID are stored. The first and second bicycle IDs are provided to the first server via the control device and may be linked to the user account and/or the user ID on the server.

The pairing data of the first server is provided to the control device. Additionally, it is contemplated that the pairing data or further pairing data is provided to the electric bicycle on the basis of the first bicycle ID.

The control device is preferably connected to the second server via the same communication interface as the first server. Alternatively or additionally, however, it is also conceivable that the control device is connected to the second server via another communication interface of the control device.

The connection is established in particular by a user input, wherein a further user ID is transmitted to the second server to identify the control device or the user. The user ID and the further user ID differ and are each associated with other servers.

After the control device is connected to the second server, different information may be provided to the second server, such as, for example, data from the electric bicycle, the control device, and/or the first server. For example, it is conceivable that the first bicycle ID, the second bicycle ID, odometer data of the electric bicycle, information regarding maintenance and/or service intervals, location variables, activity information, user data, time variables, etc. are provided to the second server.

After the control device is connected to the second server, various information from the second server may be provided to the first server or the control device, such as a name of the electric bicycle, a product name or model name, an image of the model of the cycle, a serial number, information regarding the installed components, setting parameters for the drive unit, the damping units, the gear shift units, etc.

It is also proposed that the first server is linked to the second server for direct data exchange. Advantageously, data can thereby be directly provided and, if necessary, forwarded to the control device. Alternatively, it is also conceivable that the first server and the second server are not linked to each other for data transfer, or only via the control device. Before linking, the control device communicates only with the first server. After linking, communication can additionally also occur directly with the second server.

Furthermore, it is proposed that the connection of the control device to the electric bicycle is via pairing. In particular, the control device and the electric bicycle each comprise a Bluetooth communication interface. The pairing may be automatic and/or semi-automatic, wherein the semi-automatic pairing requires at least one user input. It is conceivable, for example, that the first pairing is semi-automatic. After the first pairing, the electric bicycle and the control device are coupled and connected to each other. The connection is automatically terminated when the control device is out of range of the communication interface of the electric bicycle. However, the control device and the electric bicycle remain coupled and can be automatically or semi-automatically reconnected to each other without having to perform the pairing process again. Preferably, the control device is configured such that at least one additional function is enabled when connected to the electric bicycle. The additional function may be configured, for example, as a way to adjust assist modes, a navigational function, an option to include additional devices, or the like.

Furthermore, it is proposed that the first bicycle ID comprises a manufacturer's variable and/or a brand variable. Advantageously, a manufacturer-specific or brand-specific pairing of the control device can thereby be made.

It is also proposed that the second bicycle ID comprises a type variable and/or an item variable, for example an item number. Advantageously, a model-specific pairing of the control device can be made, for example.

Furthermore, it is proposed that the control device, in particular a display unit of the control device, is paired on the basis of the pairing data. In particular, the display unit is paired to display manufacturer information or brand information. The manufacturer information or brand information can be displayed in the coupled and connected state, or only in the connected state of the control device, with the electric bicycle.

Furthermore, it is proposed that the connection of the control device to the first server is via a first user account and the connection of the control device to the second server is via a second user account. The first user account and the second user account are thus initially configured independently of each other and can be independently established by the user.

It is also proposed that the control device, in particular the display unit of the control device, is paired on the basis of the further pairing data. Advantageously, the control device can thereby be optimally paired to the electric bicycle. The further pairing data may comprise, for example, a model designation, an image of the product or of the electric bicycle, further additional functions for the control device, etc.

Furthermore, the disclosure relates to a control device for an electric bicycle, wherein the control device is configured to control or regulate the electric bicycle, wherein the control device is configured to be releasably connectable to the electric bicycle, wherein the control device comprises a display unit, characterized in that the display unit is configured to be adjustable on the basis of a first bicycle ID and a second bicycle ID.

BRIEF DESCRIPTION OF THE DRAWINGS

Further advantages follow from the description of the drawings hereinafter. The drawings, the description, and the claims contain numerous features in combination. A person skilled in the art will appropriately also consider the features individually and combine them into additional advantageous combinations.

Shown are.

DETAILED DESCRIPTION

Figure 1:
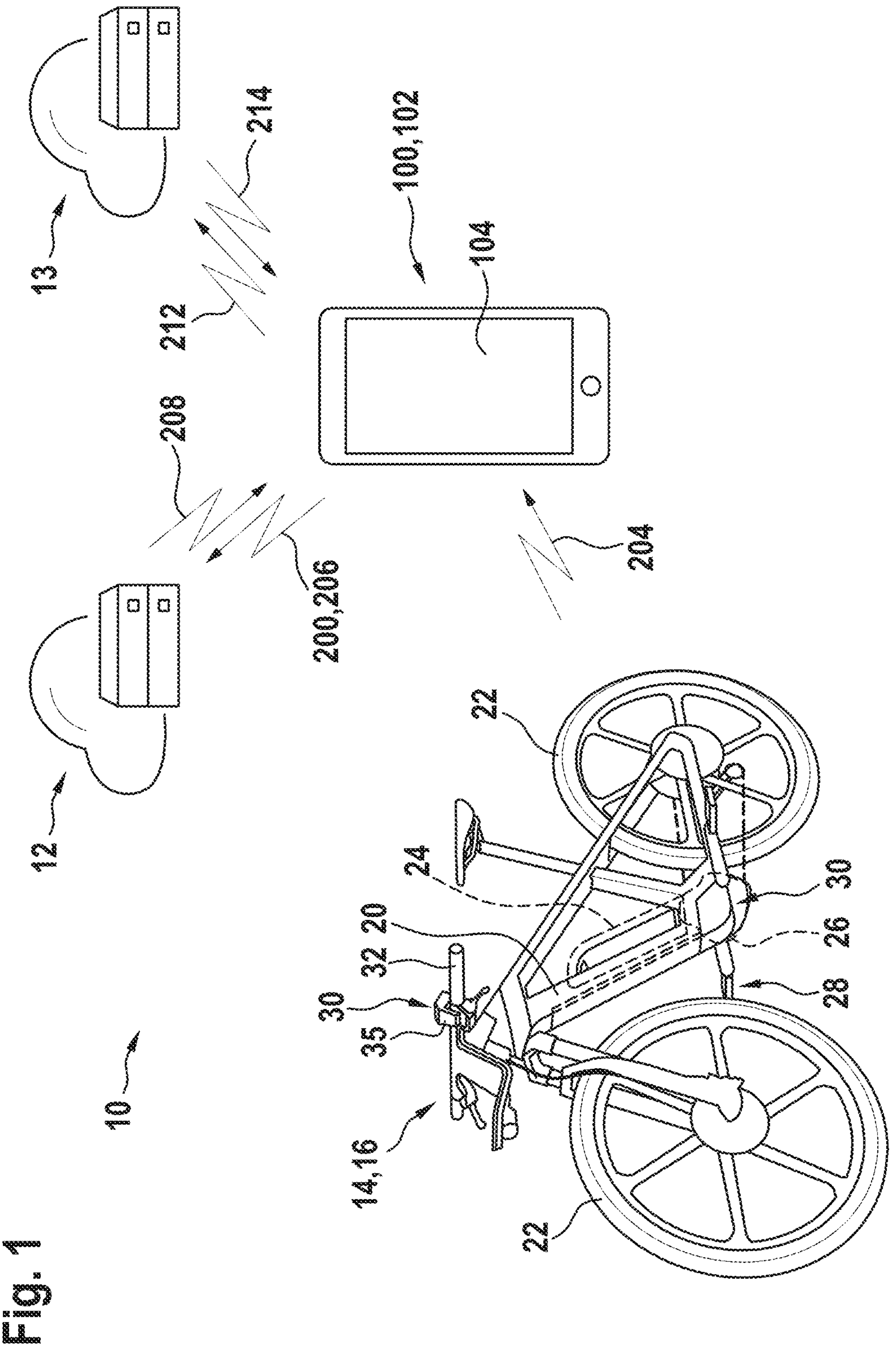
FIG. 1 a schematic view of a system for performing the method for pairing a control device for an electric bicycle.

In FIG. 1, a system 10 for pairing a control device 100 is described The system 10 includes a first server 12 and a second server 13.

Furthermore, the system 10 includes at least one bicycle unit 14. The bicycle unit 14 is designed, e.g., as an electric bicycle 16. The electric bicycle 16 can, e.g., be designed as a pedelec or an e-bike.

The electric bicycle 16 comprises a housing in the form of a frame 20 or a bike frame. Connected to the frame 20 are two wheels 22. The electric bicycle 16 further comprises an power supply unit 24 in the form of a battery pack. In addition, the electric bicycle 16 comprises a drive unit 26, which comprises an electric motor or an auxiliary motor. The electric motor is preferably designed as a permanent magnet-excited, brushless DC motor. The electric motor is, e.g., designed, as a mid-drive motor, wherein a hub motor or the like is also conceivable. The electric bicycle 16, in particular the drive unit 26 of the electric bicycle 16, is powered via the power supply unit 24. The power supply unit 24 can be externally mountable to the frame 20 or can be integrated into the frame 20.

The drive unit 26 comprises electronics comprising a control unit (not shown) designed to control or regulate the electric bicycle 16, in particular the electric motor. The electric bicycle 16 comprises a pedal crank 28. The pedal crank 28 comprises a pedal crankshaft (not shown).

The electronics and the drive unit 26 having the electric motor and the pedal crankshaft are arranged within a drive housing connected to the frame 20. The drive movement of the electric motor is preferably transmitted to the pedal crankshaft via a transmission (not shown), wherein the magnitude of the assistance by the drive unit 26 is controlled or regulated via the electronics. The electronics are designed to control the drive unit such that the rider of the electric bicycle 16 is assisted in pedaling. Preferably, the control unit is designed such that it can be operated by the rider so that the rider can set the assistance level.

The electronics include a communication interface (not shown) configured to wirelessly connect the electric bicycle 16 to the control device 100. The communication interface is configured, e.g., as a short-range communication interface, in particular in the form of a Bluetooth interface. The electric bicycle 16 also includes a second communication interface in the form of a long-range communication interface, in particular an LTE interface. In contrast to the short-range communication interface, the long-range communication interface enables a direct data connection to the first server 12 or the second server 13, which have a connection to the Internet, for example.

The electronics comprise a storage unit, wherein a first bicycle ID and a second bicycle ID are stored in the storage unit. The first bicycle ID and/or the second bicycle ID have been transferred to the electric bicycle 16 by means of the Bluetooth interface, for example. It is also contemplated that the storage is carried out during the calibration of the electric bicycle or the electronics or by means of a different communication interface. In addition, the electric bicycle 16, in particular the electronics of the electric bicycle 16, comprises a sensor unit. The sensor unit comprises, by way of example, a speed sensor, at least one movement sensor, a GPS sensor for determining the position, and a torque sensor.

In addition, the electric bicycle 16 comprises an operating unit 30 for operating the electric bicycle 16. The operating unit 30 is arranged on a handlebar 32 of the electric bicycle 16. As an example, the Bluetooth interface is arranged in a housing 35 of the operating unit 30. The operating unit 30 has, e.g., an on/off switch not shown in detail, wherein the electric bicycle 16, in particular the drive unit 26, is configured to be activated by actuating the switch. In addition, the electronic system is configured to be controllable by means of the operating unit 30, for example a selection of an assist mode of the electric bicycle 16 is possible by means of an operation of the operating unit 30.

The control device 100 is configured, e.g., as a smartphone 102. The control device 100 comprises a display unit 104 designed to display information. The display unit 104 is configured, e.g., as a touch-sensitive display, such that the control device 100 can be operated and/or controlled by actuating or touching the display unit 104.

For example, the control device 100 comprises an operating system configured to execute application software (app). The control device 100 has at least one cycling app configured to display operating information of the electric bicycle 16 and/or control the electric bicycle 16.

The control device 100 has at least one short-range communication interface corresponding to the short-range communication interface of the electric bicycle 16. The short-range communication interface is configured, e.g., as a Bluetooth interface. The control device 100 may establish a connection to the electric bicycle 16 depending on or independent of the cycling app. This connection is made, e.g., via a Bluetooth pairing process. The pairing process couples and connects the control device 100 and the electric bicycle 16 to each other. If the control device 100 is physically disconnected from the electric bicycle 16, wireless communication is also disconnected, but they remain in the coupled state.

In addition, the control device 100 comprises at least one long-range communication interface for wireless communication with the first server 12 and with the second server 13. The long-range communication interface is, e.g., configured as a 5G interface.

Figure 2:
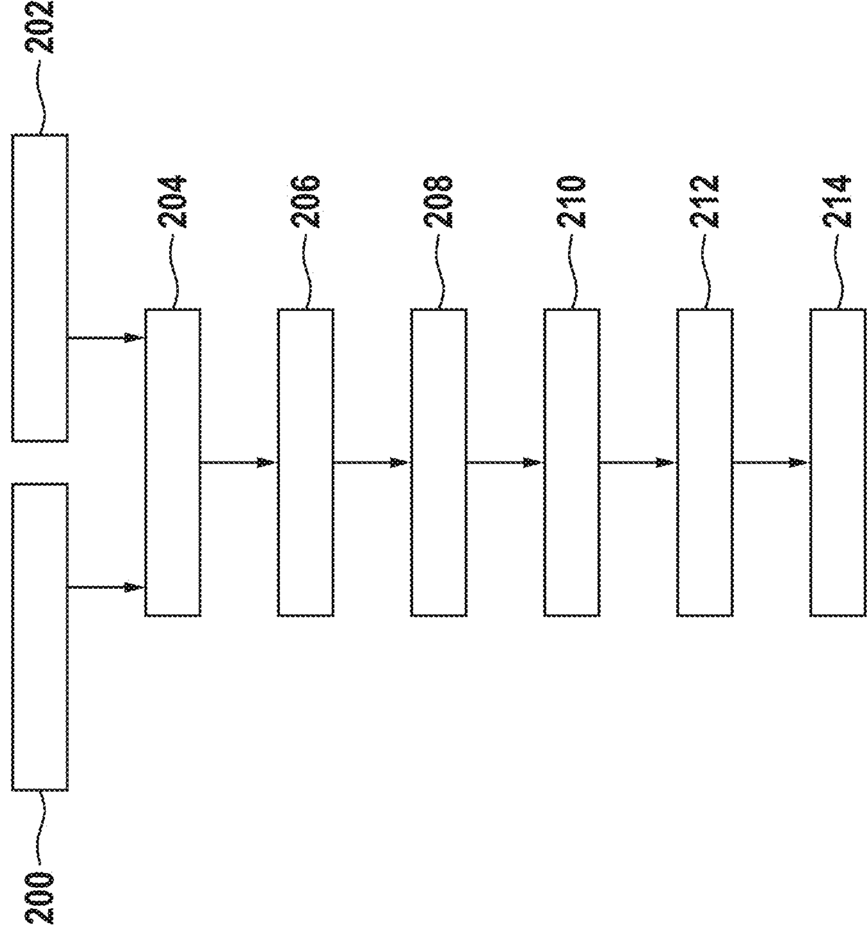
FIG. 2 a flow chart of the method for pairing the control device.
Figure 3C:
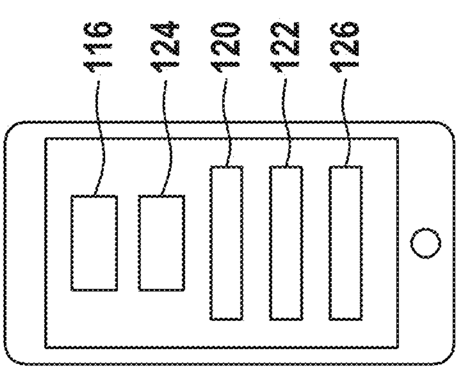
FIG. 3*c* a schematic display of the control device after connection to a second server.
Figure 3B:
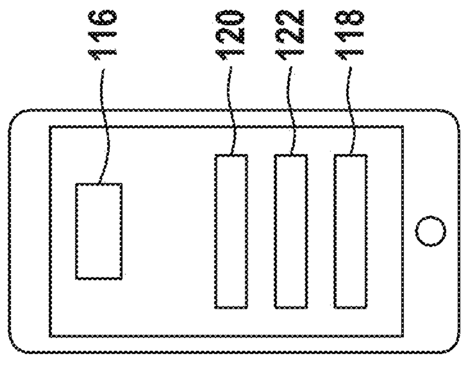
FIG. 3*b* a schematic display of the control device after connection to the electric bicycle.
Figure 3A:
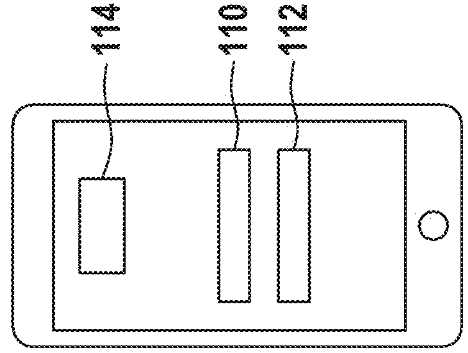
FIG. 3*a* a schematic display of the control device prior to connection to the electric bicycle.

In FIG. 2, a flow chart with the method according to the disclosure is described. In FIGS. 3*a* to 3*c*, possible displays of control device 100 at different points in time of the method are shown schematically.

In a first method step 200, the control device 100 is connected to the first server 12. For this purpose, the user specifies or creates a user ID for authentication for the first server 12.

Prior to or after connection of the control device 100 to first server 12, first functions such as shown schematically in FIG. 3*a* may be displayed by the display unit 104. The functions can be selected or started by the user. For example, function 110 may be used to start a pairing process between the control device 100 and electric bicycle 16, and/or to search for an electric bicycle 16 suitable for pairing in the surrounding environment. Further functions are conceivable, such as a function 112 that directs the user to a help center. In addition, the display unit 104 may display a first label 114 that is configured, for example, as a manufacturer name or logo of a system component of the electric bicycle 16. For example, the system component may be configured as a drive unit 26, a power supply unit 24, or an HMI of the electric bicycle 16. In particular, the system component comprises the short-range communication interface. The manufacturer of the system component is in particular different from the manufacturer of the electric bicycle. In the context of this application, a manufacturer is to be understood to mean in particular a manufacturer, seller, and/or provider. The first server 12 is associated with the manufacturer of the system component.

In a second method step 202, the control device 100 is connected to an electric bicycle 16 via pairing.

In a further method step 204, a first bicycle ID and a second bicycle ID are provided by the connected electric bicycle. The first bicycle ID includes, by way of example, a brand variable and the second bicycle ID includes, by way of example, am item number.

In a further method step 206, the first bicycle ID, optionally the first bicycle ID, and the second bicycle ID, is provided to the first server 12 by the control device 100.

In a further method step 208, the control device 100 is provided with pairing data on the basis of the first bicycle ID by the first server 12.

In a further method step 210, the control device 100, in particular the bicycle app of the control device 100, is adjusted on the basis of the pairing data. For example, the pairing data of the first server 12 may be used to change the label 114 to a changed label 116, as shown schematically in FIG. 3*b*. The changed label 116 is preferably associated with the manufacturer of the electric bicycle 16. For example, the changed label 116 may be configured as a manufacturer name or logo. In addition, a connection option 118 is provided to the control device 100 by the pairing data, wherein the control device 100 may be connected to the second server 13 by means of the connection option.

Regardless of the pairing data, the control device 100 has bicycle functions in the connected state that are configured to control the electric bicycle 16 or to display operating information of the electric bicycle 16. For example, the control device 100 includes a bicycle function 120 configured to set an assist mode. The user may, by way of example, select between Eco, Tour, eMTB and Turbo modes, wherein control of the drive unit 26 of the electric bicycle 16 is paired on the basis of the selection. In addition, the control device 100 includes a further cycle function 122 configured as a speed indicator and a charge state indicator of the power supply unit 24.

In a further method step 212, a connection of the control device 100 to the second server 13 is established in particular by the connection option 118. The connection is preferably established by means of a second user ID for authentication with the second server 13.

In a further method step 214 further pairing data of the second server 14 based on the second bicycle ID are provided. Based on the further pairing data, there is an additional pairing of the control device 100. On the one hand, a bicycle label 124 is provided that is paired in addition to the changed label 116. For example, the bicycle label 124 may include an image of the cycle model of the electric bicycle 16 and/or a model name. It would also be conceivable that the changed label 116 is paired once again. The pairing data may be transmitted directly from the second server 13 or the user account of the first server 12 may be first linked to the user account of the second server 13 so that data can be exchanged between the servers 12, 13. In this case, it is also conceivable that the further pairing data are provided by the first server 12 of the control device 100.

The further pairing data also replace the connection option 118 with at least one additional function 126, thereby providing the user with further information regarding the electric bicycle 16, such as the installed components of the bicycle that are not system components, such as a brake, a gear shift, a damping unit, or the like. The further information may also include service intervals for the system components or the further installed components.

The invention claimed is:

1. A method for adjusting a control device for an electric bicycle, comprising:

connecting the control device to the electric bicycle to receive data from the electric bicycle;

providing a first bicycle ID and a second bicycle ID of the electric bicycle to the control device from the electric bicycle, the first bicycle ID different from the second bicycle ID;

providing pairing data from a first server to the control device based on the first bicycle ID;

providing further pairing data from a second server to the control device based on the second bicycle ID, the second server different from the first server and the further pairing data different from the pairing data; and adjusting a display unit of the control device based on the pairing data and the further pairing data.

2. The method according to claim 1, wherein the first server is linked to the second server for direct data exchange that bypasses the control device.

3. The method according to claim 1, wherein the control device is connected to the electric bicycle via pairing.

4. The method according to claim 1, wherein the first bicycle ID comprises a manufacturer's variable and/or a brand variable.

5. The method according to claim 1, wherein the second bicycle ID comprises a type variable and/or an item variable.

6. The method according to claim 1, wherein adjusting the display unit includes displaying manufacturer information or brand information based on the pairing data and the further pairing data.

7. The method according to claim 1, wherein:

the control device connects to the first server based on a first user account, and the control device connects to the second server based on a second user account that is different from the first user account.

8. The method according to claim 1, wherein:

the control device is configured to control or regulate the electric bicycle, the control device is configured to be releasably connectable to the electric bicycle, and the display unit is configured to be pairable based on the first bicycle ID and the second bicycle ID.

9. The method according to claim 1, wherein the control device is configured as a mobile device.

10. The method according to claim 9, wherein the mobile device is a smartphone or a smartwatch.

11. A method for adjusting a control device for an electric bicycle, the control device including a display unit, the method comprising:

connecting the control device to the electric bicycle;

receiving first user account data and second user account data from the electric bicycle using the control device, the second user account data different from the first user account data;

receiving a first bicycle ID and a second bicycle ID from the electric bicycle using the control device, the second bicycle ID different from the first bicycle ID;

establishing a connection of the control device to a first server using the first user account data;

establishing a connection of the control device to a second server using the second user account data, the second server different from the first server;

providing the first bicycle ID to the first server;

providing the second bicycle ID to the second server;

providing first pairing data from the first server based on the first bicycle ID;

providing second pairing data from the second server based on the second bicycle ID;

adjusting an appearance of a first label as shown on the display unit based on the first pairing data; and adjusting an appearance of a second label as shown on the display unit based on the second pairing data, the second label different from the first label.

* * * * *